United States Patent
Iwasaki

(10) Patent No.: US 8,958,387 B2
(45) Date of Patent: Feb. 17, 2015

(54) SUPPRESSION OF INTERFERENCES BETWEEN CELLS

(75) Inventor: Motoya Iwasaki, Tokyo (JP)

(73) Assignee: Lenovo Innovations Limited (Hong Kong), Quarry Bay (HK)

(*) Notice: Subject to any disclaimer, the term of this patent is extended or adjusted under 35 U.S.C. 154(b) by 990 days.

(21) Appl. No.: 11/958,621

(22) Filed: Dec. 18, 2007

(65) Prior Publication Data

US 2008/0151832 A1 Jun. 26, 2008

(30) Foreign Application Priority Data

Dec. 22, 2006 (JP) ................. 2006-345786

(51) Int. Cl.
*H04W 4/00* (2009.01)
*H04W 52/24* (2009.01)
*H04B 17/00* (2006.01)
*H04W 52/34* (2009.01)
*H04W 52/14* (2009.01)

(52) U.S. Cl.
CPC ........... *H04W 52/243* (2013.01); *H04B 17/005* (2013.01); *H04W 52/146* (2013.01); *H04W 52/247* (2013.01); *H04W 52/343* (2013.01); *Y02B 60/50* (2013.01)
USPC .......................................... 370/330; 370/478

(58) Field of Classification Search
None
See application file for complete search history.

(56) References Cited

U.S. PATENT DOCUMENTS

| | | | | |
|---|---|---|---|---|
| 5,551,057 A | * | 8/1996 | Mitra | 455/522 |
| 6,778,507 B1 | * | 8/2004 | Jalali | 370/317 |
| 7,116,700 B1 | * | 10/2006 | Sivakumar | 375/132 |
| 8,478,283 B2 | * | 7/2013 | Periyalwar et al. | 455/452.1 |
| 2001/0053695 A1 | * | 12/2001 | Wallentin | 455/436 |
| 2002/0031105 A1 | * | 3/2002 | Zeira et al. | 370/337 |
| 2003/0003906 A1 | * | 1/2003 | Demers et al. | 455/424 |
| 2003/0021336 A1 | * | 1/2003 | Iwasaki | 375/147 |
| 2004/0095907 A1 | * | 5/2004 | Agee et al. | 370/334 |
| 2004/0106381 A1 | * | 6/2004 | Tiller | 455/73 |
| 2004/0127223 A1 | * | 7/2004 | Li et al. | 455/446 |
| 2004/0127259 A1 | * | 7/2004 | Matsunaga | 455/560 |
| 2006/0209721 A1 | * | 9/2006 | Mese et al. | 370/254 |
| 2006/0215611 A1 | * | 9/2006 | Nakagawa et al. | 370/332 |
| 2006/0234752 A1 | * | 10/2006 | Mese et al. | 455/522 |
| 2006/0274691 A1 | * | 12/2006 | Naguib et al. | 370/330 |

(Continued)

FOREIGN PATENT DOCUMENTS

| | | |
|---|---|---|
| JP | 11275639 A | 10/1999 |
| JP | 2003259414 A | 9/2003 |

(Continued)

OTHER PUBLICATIONS

European Search Report for EP Application No. 07024163.3, completed Mar. 14, 2008.

(Continued)

*Primary Examiner* — Bunjob Jaroenchonwanit
(74) *Attorney, Agent, or Firm* — Sughrue Mion, PLLC

(57) ABSTRACT

An interference power measuring circuit in a base station measures the interference power in a cell that the base station belongs to. When the measured interference power is larger than a predetermined value, the transmitter in the base station transmits the interference information for each frequency used in the FDMA communication system to a base station in a neighboring cell. The base station in the neighboring cell instructs user equipment that communicates the base station to reduce a transmission power.

12 Claims, 4 Drawing Sheets

(56) References Cited

U.S. PATENT DOCUMENTS

| | | | |
|---|---|---|---|
| 2007/0054620 A1* | 3/2007 | Zeira et al. | 455/63.1 |
| 2007/0076650 A1* | 4/2007 | Manjeshwar et al. | 370/328 |
| 2007/0082616 A1* | 4/2007 | Bird | 455/63.1 |
| 2007/0087707 A1* | 4/2007 | Blair et al. | 455/127.1 |
| 2007/0280332 A1* | 12/2007 | Srikanteswara et al. | 375/130 |
| 2007/0291702 A1* | 12/2007 | Nanba et al. | 370/336 |
| 2008/0043879 A1* | 2/2008 | Gorokhov et al. | 375/296 |
| 2008/0069062 A1* | 3/2008 | Li et al. | 370/338 |
| 2008/0240217 A1* | 10/2008 | Lee et al. | 375/227 |
| 2011/0064044 A1* | 3/2011 | Ofuji et al. | 370/330 |

FOREIGN PATENT DOCUMENTS

| | | |
|---|---|---|
| JP | 2005501444 A | 1/2005 |
| JP | 2005065182 A | 3/2005 |
| JP | 2005142968 A | 6/2005 |
| JP | 2006157890 A | 6/2006 |
| JP | 2006217415 A | 8/2006 |
| WO | 9945736 A1 | 9/1999 |
| WO | 2006/099548 A1 | 9/2006 |
| WO | 2006098665 A | 9/2006 |
| WO | 2006099547 A1 | 9/2006 |

OTHER PUBLICATIONS

Japanese Office Action for JP Application No. 2012-138729 mailed on Jul. 16, 2013 with Partial English Translation.

Japanese Office Action for JP2006-3457136 issued Jan. 4, 2012.

Communication dated Sep. 26, 2014 from the State Intellectual Property Office of the People's Republic of China in counterpart application No. 201110346107.8.

* cited by examiner

SUPPRESSION OF INTERFERENCES BETWEEN CELLS

This application is based upon and claims the benefit of priority from Japanese patent application No. 2006-345786 filed on Dec. 22, 2006, the disclosure of which is incorporated herein in its entirety by reference.

BACKGROUND OF THE INVENTION

1. Field of the Invention

The present invention relates to a mobile communication system, and more particularly to a method of suppressing interferences between cells.

2. Description of the Related Art

In a mobile communication system, interferences between peripheral cells are a serious problem.

In order to solve this problem, recent mobile communication systems that employ a CDMA (Code Division Multiple Access) scheme code-spread transmission signals using codes that differ from cell to cell or from user to user, and despread the spread transmission signals using a spread gain at the reception side to relatively suppress interference signals However, in a case where codes between users are not perfectly orthogonal to one another, such as on uplink lines in a WCDMA (Widened CDMA) scheme, signals from other users can cause interferences, resulting in a reduction in the number of users that can be accommodated in a cell, as compared with a case where codes between users are orthogonal to one another. As a result, the sum of data speeds of all users in a cell, i.e., the cell capacity, decreases.

In a FDMA (Frequency Division Multiple Access) mobile communication system prior to the advent of a CDMA mobile communication system, frequencies which differ between neighboring cells are allocated to user equipments, to avoid interferences. However, this in turn causes unavailable frequencies for each cell, thus decreasing the efficiency of use of frequencies.

In the next mobile communication system, it is considered that, in order to carry out orthogonalization among users, the same frequency is used even among neighboring cells to apply the FDMA scheme for uplink signals and to avoid a decrease in the efficiency of use of frequencies. Although it is expected that interferences among cells can be avoided to some extent by using a retransmission scheme, such as HARQ (Hybrid Automatic Repeat reQuest), further improvements are desired.

Documents that are related to the technique described above include: "Spectrum spread communication and its application" written by G. Marubayashi, M. Nakagawa, R. Kohno, published Electronics, Information, and Communication Society, May 10, 1998, P. 188~199, and "Foundations of mobile communications" editorially supervised by Y. Okumura, M. Shinshi supervised, published by Electronics, Information, and Communication Society, Oct. 1, 1986, P. 188~195

SUMMARY OF THE INVENTION

It is an object of the present invention to provide a base station in a FDMA communication system, a FDMA communication system, a method for a FDMA communication system, a user terminal in a FDMA communication system which are capable of reducing interferences between cells to thereby enhance the throughput of the system.

A base station in a FDMA communication system, according to the present invention, includes: a measuring circuit that measures an interference power; and a transmitter that transmits interference information to a neighboring base station when the measured interference power is larger than a predetermined value.

A FDMA communication system, according to the present invention, includes: a base station; a neighboring base station that is neighbor to the base station; and user equipment that communicates with the neighboring base station, wherein the base station measures an interference power and transmits interference information to the neighboring base station when the measured interference power is larger than a predetermined value, and the neighboring base station receives the interference information from the base station.

A method for a FDMA communication system including a base station and a neighboring base station, according to the present invention, includes: measuring an interference power by the base station; and transmitting, by the base station, interference information to the neighboring base station when the measured interference power is larger than a predetermined value.

User equipment in a FDMA communication system including a base station and a neighboring base station, according to the present invention, includes: a transmitter that transmits a signal to the neighboring base station; and a receiver that receives interference information from the base station when an interference power measured by the base station is larger than a predetermined value.

The above and other objects, features and advantages of the present invention will become apparent from the following description with reference to the accompanying drawings which illustrate examples of the present invention.

EXEMPLARY EMBODIMENTS

Figure 1A:
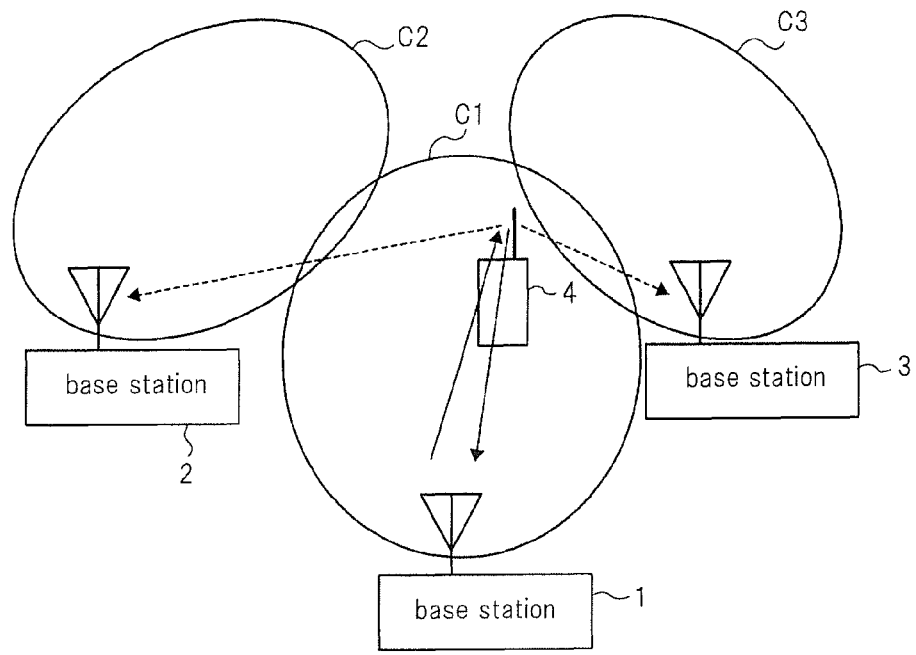
FIG. 1A is a diagram showing the configuration of a FDMA communication system according to a exemplary first embodiment of the present invention.

FIG. 1A illustrates the configuration of a FDMA communication system according to a first exemplary embodiment of the present invention. In the present embodiment, it is assumed that three cells C1, C2, and C3 are arranged such that cells C2 and C3 are located around cell C1, and that the transmission power of user equipments within cell C1 will be reduced. Base stations 1 to 3 are present within respective cells C1, C2, and C3. Base station 1 comprises transmitter 11, receiver 12, interference power measuring circuit 13, and transmission power control signal generator 14A. Base station 2 and 3 are of the same configuration as base station 1. Other constituent elements of base stations 1 to 3 are not illustrated because they are not directly related to the present invention. User equipment 4 within cell C1 comprises transmitter 21, receiver 22A, and transmission power control circuit 23A. Other constituent elements of user equipment 4 are not illustrated because they are not directly related to the present invention. For the sake of simplicity, other user equipment within cell C1 and other terminals within cells C2 and C3 are not illustrated.

Operation of the present exemplary embodiment will be described below.

An uplink transmission from user equipment is carried out by varying a time (time slot) and frequency at which the user equipment transmits a signal, from user equipment to user equipment for multiplexing a plurality of user signals.

Each scheduler (not shown) in base station 1 to 3 in cells C1 to C3 is performing scheduling, for user equipment in the cell, that specifies a time-slot and frequency at which each user equipment transmits a user signal.

Interference power measuring circuit 13 in base station 2 measures the interference power in cell C2, and if the measured interference power is larger than a predetermined value, transmitter 11 transmits interference information for each frequency used in the FDMA communication system to base station 1 in the neighboring cell C1. The interference information includes the frequency and time-slot information of the measured interference power. In base station 1 in cell C1, transmission power control signal generator 14A generates a transmission power control signal to instruct user equipment 4 and other user equipment (not shown) that are communicating with base station 1 to reduce a transmission power and transmits the transmission power control signal to user equipment 4 and other user equipment via transmitter 11. Upon receipt of the transmission power control signal by receiver 22A in user equipment 4, transmission power control circuit 23A controls transmitter 21 to reduce the transmission power.

According to the present embodiment, interferences between cells can be reduced to thereby enhance the throughput of the system, because, when a measured interference power is larger than a predetermined value, a base station in the neighboring cell instructs user terminal to reduce a transmission power.

Figure 1B:
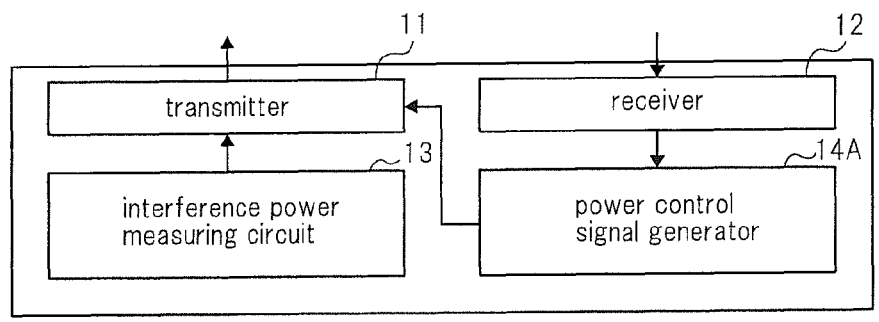
FIGS. 1B and 1C are block diagrams of base stations and user equipment shown in FIG. 1A, respectively.
Figure 1C:
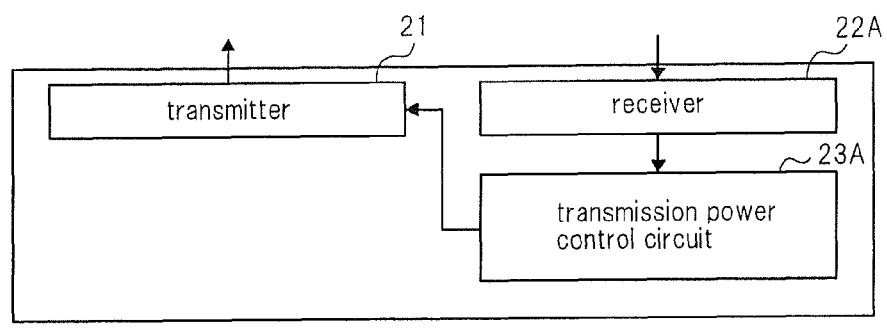
Figure 2A:
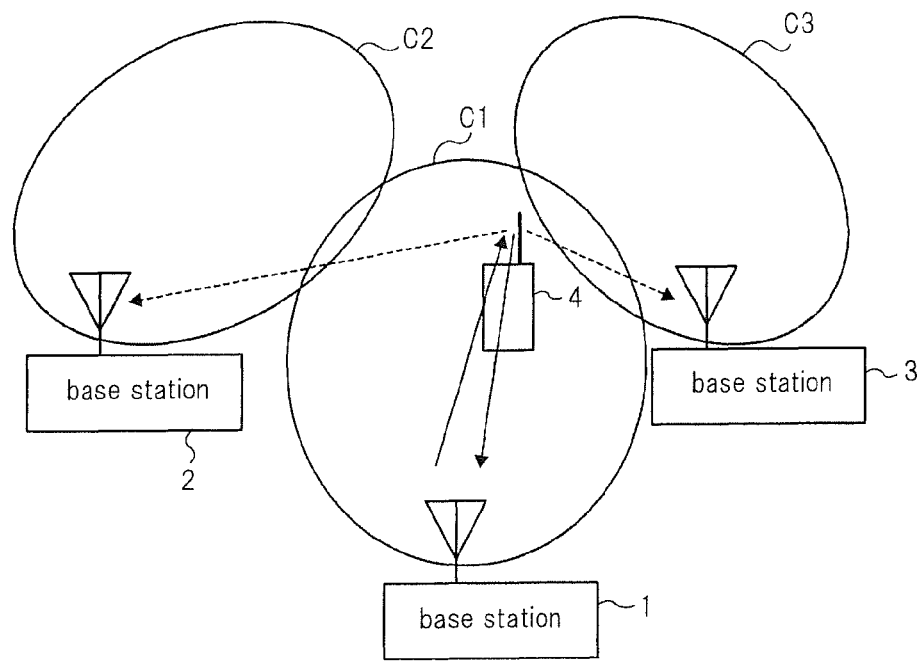
FIG. 2A is a diagram showing the configuration of a FDMA communication system according to a second exemplary embodiment of the present invention.
Figure 2B:
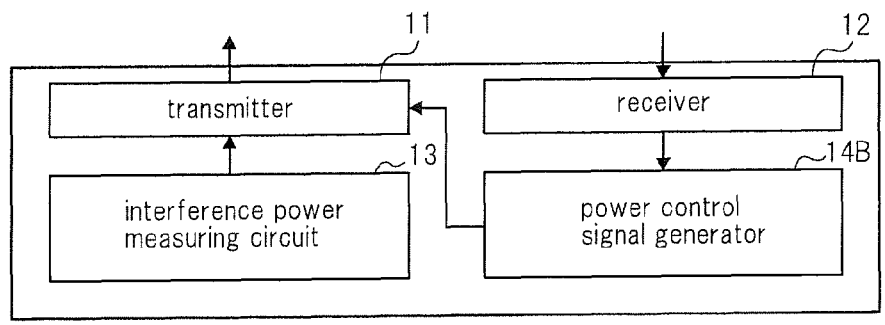
FIGS. 2B and 2C are block diagrams of base stations and user equipment shown in FIG. 2A, respectively.
Figure 2C:
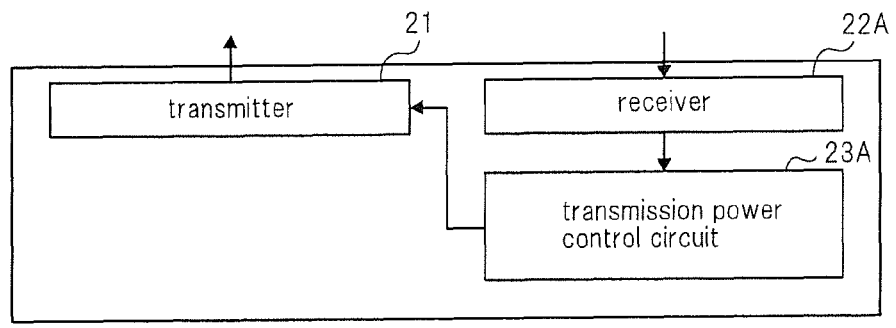

FIG. 2A illustrates the configuration of a FDMA communication system according to a second exemplary embodiment of the present invention. As can be seen from FIGS. 2B and 2C, the present embodiment differs from the first embodiment in that base stations 1 to 3 comprise transmission power control signal generator 14B instead of transmission power control signal generator 14A shown in FIG. 1B. Transmission power control signal generator 14B compares the frequency and time-slot information of a signal received by base station 1 from user equipment 4 and other user equipment that are communicating with base station 1 within cell C1 with the frequency and time-slot information included in the interference information received from base station 2, When the correlativity (for example, a cross-correlation) between them is high, for example, the correlativity between the frequency and time-slot information of a signal received from user equipment 4 and the frequency and time-slot information included in the interference information received from base station 2, is high, transmission power control signal generator 14B generates a transmission power control signal to instruct user equipment 4 to reduce a transmission power and transmits the transmission power control signal to user equipment 4 via transmitter 11.

According to the present embodiment, interferences between cells can be reduced to thereby enhance the throughput of the system, because, based on the result of the comparison between the frequency and time-slot information of a signal received by a base station from user equipment that are communicating with base station and the frequency and time-slot information included in the interference information received from a neighboring base station, a transmission power of user equipment is controlled.

Figure 3A:
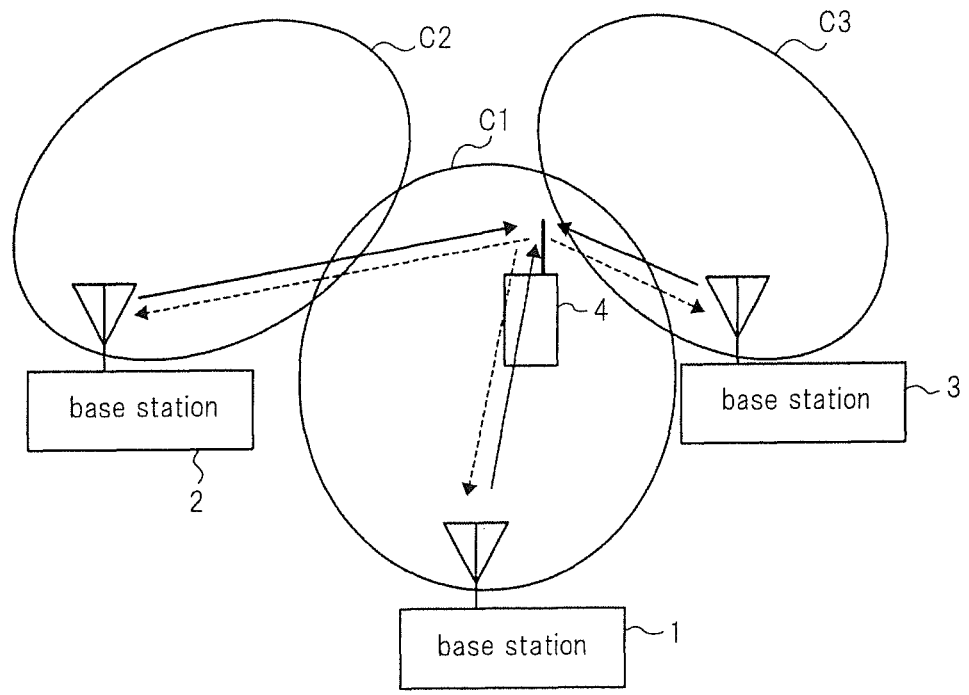
FIG. 3A is a diagram showing the configuration of a FDMA communication system according to a third exemplary embodiment of the present invention.
Figure 3B:
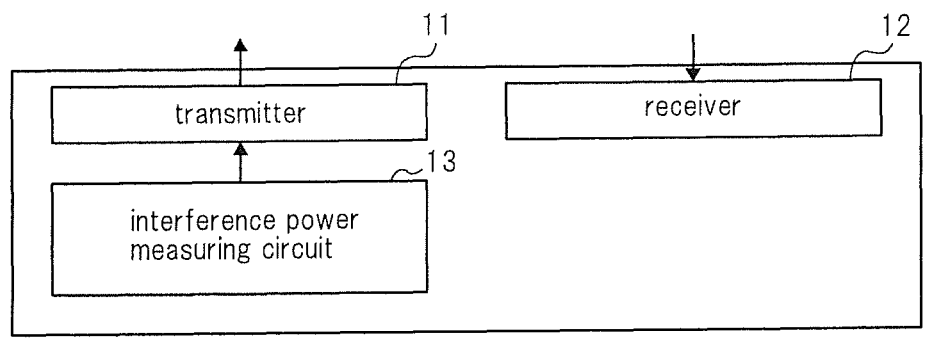
FIGS. 3B and 3C are block diagrams of base stations and user equipment shown in FIG. 3A, respectively.
Figure 3C:
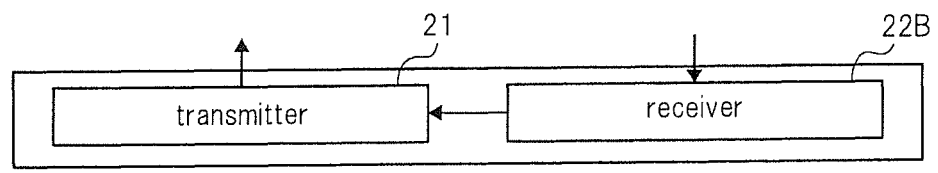

FIG. 3A illustrates the configuration of a mobile communications system according to a third exemplary embodiment of the present invention. In the present exemplary embodiment as well, it is assumed that three cells C1, C2, and C3 are arranged such that cells C2 and C3 are located around cell C1, and that the transmission power of user equipment within cell C1 will be reduced. Base stations 1 to 3 are present within respective cells C1, C2, and C3. Base stations 1 to 3 are of the same configuration and each comprises transmitter 11, receiver 12, and interference power measuring circuit 13. Other constituent elements of base stations 1 to 3 are not illustrated because they are not directly related to the present invention. User equipment 4 comprises transmitter 21 and receiver 22B. Other constituent elements of user equipment 4 are not illustrated because they are not directly related to the present invention. For the sake of simplicity, other user equipments within cell C1 and user equipments within cell C2 and C3 are not illustrated.

An uplink transmission from user equipment is carried out by varying a time (time-slot) and frequency at which the user equipment transmits a signal, from user equipment to user equipment for multiplexing a plurality of user signals.

Each scheduler (not shown) in base stations 1 to 3 in cells C1 to C3 is performing scheduling, for user equipments in the cell, that specifies a time-slot and frequency at which each user equipment transmits a user signal.

Transmitter 21 in user equipment 4 in cell C1 transmits a signal to base station 2 in cell C2. In response, interference power measuring circuit 13 in base station 2 measures a interference power, and when the measured interference power is larger than a predetermined value, transmitter 11 transmits interference information for each frequency used in the FDMA communication system to user equipment 4 The interference information includes the frequency and time-slot information of the measured interference power. In user equipment 4, in response to the interference information, receiver 22B controls transmitter 21 to reduce the transmission power of a signal to be transmitted from transmitter 21.

According to the present embodiment, interferences between cells can be reduced to thereby enhance the throughput of the system, because, upon receipt of interference information from a base station in a neighboring cell when an interference power measured by the base station is larger than a predetermined value, a transmitter in user equipment reduces a transmission power of a signal to be transmitted therefrom.

Figure 4A:
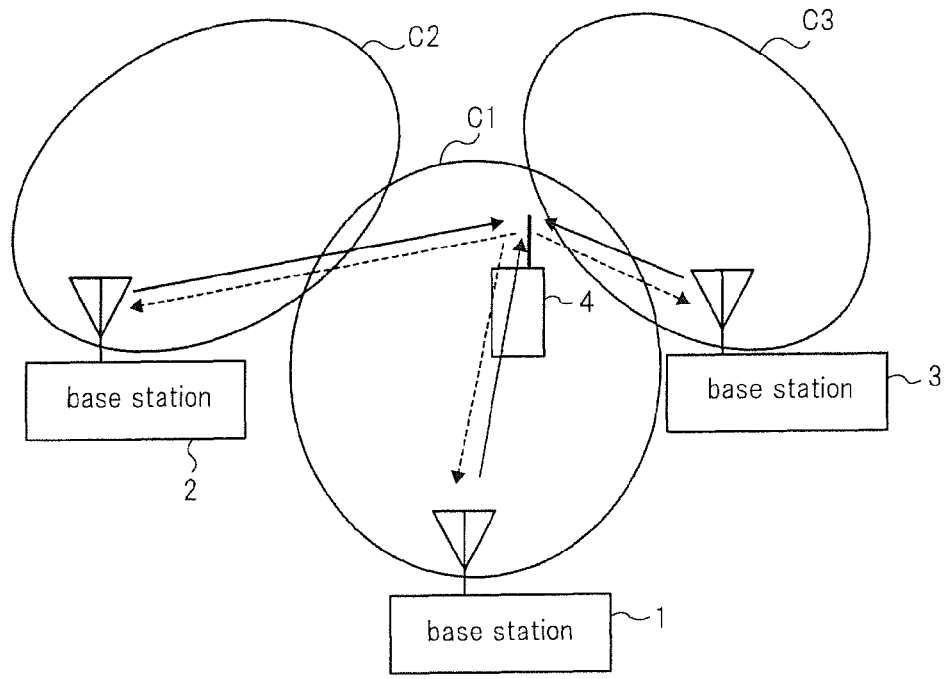
FIG. 4A is a diagram showing the configuration of a FDMA communication system according to a fourth exemplary embodiment of the present invention.
Figure 4B:
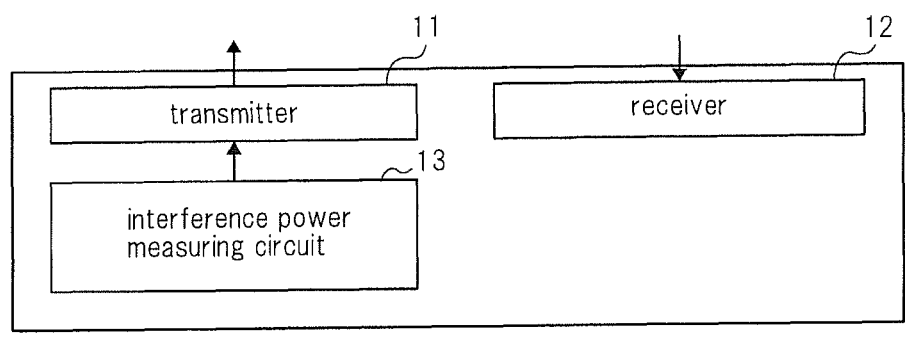
FIGS. 4B and 4C are block diagrams of base stations and user equipment shown in FIG. 3A, respectively.
Figure 4C:
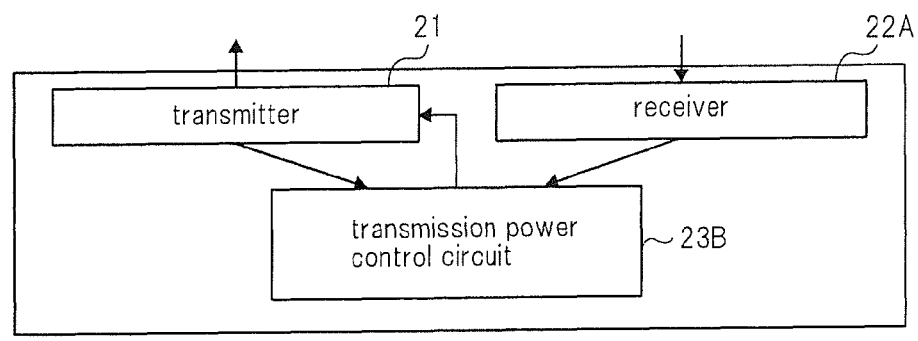

FIG. 4A illustrates the configuration of a FDMA communication system according to a fourth exemplary embodiment of the present invention. As can be seen from FIGS. 4B and 4C, the present exemplary embodiment differs from the third embodiment in that user equipment 4 and other user equipment (not shown) further comprise transmission power control circuit 23B. In user equipment 4, upon receipt of the interference information from base station 2, transmission power control circuit 23B compares the frequency and time-slot information of the interference information received from base station 2 with the frequency and time-slot information of a signal transmitted by transmitter 21 in user equipment 4. When the correlativity (for example, a cross-correlation) between them is high, transmission power control circuit 23B controls transmitter 21 to reduce the transmission power.

According to the present embodiment, interferences between cells can be reduced to thereby enhance the throughput of the system, because, based on the result of the comparison between the frequency and time-slot information of a signal received from a neighboring base station and the frequency and time-slot information of a signal transmitted by a transmitter in user equipment, a transmission power of user equipment is controlled.

While preferred embodiments of the present invention have been described using specific terms such description is for illustrative purposes only and it is to be understood that changes and variations may be made without departing from the spirit or scope of the following claims.

What is claimed is:

1. A mobile communication system using FDMA for an uplink and comprising:
    a radio base station;
    a neighboring base station that neighbors the base station; and
    user equipment;
    wherein the same frequency for the uplink is used between the radio base station and the neighboring base station, and a time-slot and a frequency to be transmitted by each unit of the user equipment are changed for each unit of the user equipment to multiplex a plurality of user signals,
    wherein the radio base station includes a first circuit that measures an interference power in a cell that belongs to the radio base station, and a second circuit that transmits to the neighboring base station interference information that includes frequency information in which the interference power is measured, wherein the measured interference power at least relates to the neighboring base station;
    wherein the neighboring base station includes a third circuit that receives the interference information from the radio base station, and a fourth circuit that checks a correlativity between the frequency and the time-slot of the interference information and that of a signal received from the user equipment and that performs scheduling, for a unit of user equipment in a cell that belongs to the neighboring base station, the scheduling specifying a time-slot and a frequency; and
    wherein the user equipment includes a fifth circuit that transmits an uplink user signal in accordance with the time-slot and frequency that are specified by the scheduling.

2. The mobile communication system according to claim 1, wherein the interference information further includes time-slot information of the measured interference power.

3. The mobile communication system according to claim 1, wherein the neighboring base station further includes a sixth circuit that instructs a unit of user equipment in a cell that belongs to the neighboring base station to reduce a transmission power in response to the interference information received from the radio base station.

4. In a mobile communication system using FDMA for an uplink and comprising: a radio base station; a neighboring base station that neighbors the base station; and user equipment, wherein the same frequency for the uplink is used between the radio base station and the neighboring base station, and a time-slot and a frequency to be transmitted by each of unit of the user equipment are changed for each unit of the user equipment to multiplex a plurality of user signals, the radio base station comprising:
    a first circuit that measures an interference power in a cell that belongs to the radio base station; and
    a second circuit that transmits to the neighboring base station interference information that includes frequency information in which the interference power is measured, wherein the measured interference power at least relates to the neighboring base station,
    wherein the neighboring base station includes a third circuit that receives the interference information from the radio base station, and a fourth circuit that checks a correlativity between the frequency and the time-slot of the interference information and that of a signal received from the user equipment and that performs scheduling, for a unit of user equipment in a cell that belongs to the neighboring base station, the scheduling specifying a time-slot and a frequency.

5. The radio base station according to claim 4, wherein the interference information further includes time-slot information of the measured interference power.

6. The radio base station according to claim 4, further comprising a third circuit that instructs a unit of user equipment in a cell that belongs to the base station to reduce a transmission power in response to the interference information received from the neighboring radio base station.

7. In a mobile communication system using FDMA for an uplink and comprising: a radio base station; a neighboring base station that neighbors the base station; and user equipment, wherein the same frequency for the uplink is used between the radio base station and the neighboring base station, and a time-slot and a frequency to be transmitted by each unit of the user equipment are changed for each unit of the user equipment to multiplex a plurality of user signals, the user equipment comprising:
    a first circuit that communicates with the neighboring base station that receives, from the radio base station that measures an interference power in a cell that belongs to the radio base station, the interference information including frequency information in which the interference power is measured, wherein the measured interference power at least relates to the neighboring base station; and
    a second circuit that transmits an uplink user signal in accordance with the time-slot and frequency that are specified by a scheduling based on the received interference information in the neighboring base station,
    wherein the neighboring base station includes a third circuit that receives the interference information from the radio base station, and a fourth circuit that checks a correlativity between the frequency and the time-slot of the interference information and that of a signal received from the user equipment and that performs scheduling, for a unit of user equipment in a cell that belongs to the neighboring base station, the scheduling specifying a time-slot and a frequency.

8. The user equipment according to claim 7, wherein the interference information further includes time-slot information of the measured interference power.

9. The user equipment according to claim 7, further comprising a third circuit that reduces a transmission power in accordance with an instruction to reduce a transmission power that is issued by the neighboring station in response to the interference information received from the radio base station.

10. A method of suppressing interferences between cells in a mobile communication system using FDMA for an uplink and comprising: a radio base station; a neighboring base station that neighbors the base station; and user equipment, wherein the same frequency for the uplink is used between the radio base station and the neighboring base station, and a time-slot and a frequency to be transmitted by each unit of the user equipment are changed for each unit of the user equipment to multiplex a plurality of user signals, the method comprising the steps of measuring, by the radio base station, an interference power in a cell that belongs to the radio base station;

transmitting, by the radio base station, to the neighboring base station interference information that includes frequency information in which the interference power is measured, wherein the measured interference power at least relates to the neighboring base station;

receiving, by the neighboring base station, the interference information from the radio base station, and checking, by the neighboring base station, a correlativity between the frequency and the time-slot of the interference information and that of a signal received from the user equipment.

11. The method according to claim 10, wherein the interference information further includes time-slot information of the measured interference power.

12. The method according to claim 10, further comprising the step of instructing, by the neighboring base station, a unit of user equipment in a cell that belongs to the neighboring base station to reduce a transmission power in response to the interference information received from the radio base station.

* * * * *